US012769777B1

(12) United States Patent
Or et al.

(10) Patent No.: US 12,769,777 B1
(45) Date of Patent: Oct. 20, 2026

(54) SUMMARIZATION PRIORITIZED RETRIEVAL PROCESS

(71) Applicant: Dell Products L.P., Round Rock, TX (US)

(72) Inventors: Tom Or, Beer Sheva (IL); Ofir Ezrielev, Be'er Sheva (IL); Lev Makler, Be'er Sheva (IL); Anat Parush Tzur, Tel Aviv (IL); Aviv Zeilig, Rosh Haayin (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/285,083

(22) Filed: Jul. 30, 2025

(51) Int. Cl.
*G06F 16/00* (2019.01)
*G06F 16/338* (2019.01)
*G06F 16/34* (2019.01)

(52) U.S. Cl.
CPC .......... *G06F 16/345* (2019.01); *G06F 16/338* (2019.01)

(58) Field of Classification Search
CPC ............................ G06F 16/338; G06F 16/345
USPC ......................................................... 707/748
See application file for complete search history.

(56) References Cited

U.S. PATENT DOCUMENTS 1,205,977 A * 11/1916 Madisetti ............ C09D 163/00 220/62.2
12,242,468 B1 * 3/2025 Brenner ................ G06F 16/242 707/707
12,254,029 B1 * 3/2025 Veillon ................. G06F 16/243 707/707
12,254,272 B1 * 3/2025 Cetoli ................... G06F 40/289 707/707
12,554,780 B1 * 2/2026 Han ........................ G06F 16/93 707/707
12,591,742 B1 * 3/2026 Zhang ................... G06F 40/289 707/707
12,596,733 B1 * 4/2026 Cirelli ................ G06F 16/3334 707/707
2025/0225402 A1 * 7/2025 Gross ..................... G06N 3/045 707/707
2025/0371051 A1 * 12/2025 Dar ..................... G06F 16/3334 707/707

(Continued)

OTHER PUBLICATIONS

Zilliz, "How to Evaluate a Vector Database?" Medium, Dec. 26, 2023, retrieved from <https://medium.com/@zilliz_learn/how-to-evaluate-a-vector-database-86dfdcc67d9b> on Jul. 29, 2025 (9 pages).

(Continued)

*Primary Examiner* — Alexandria Y Bromell
(74) *Attorney, Agent, or Firm* — WOMBLE BOND DICKINSON (US) LLP

(57) ABSTRACT

Methods and systems for managing operation of a data processing system are provided. The data processing system may provide computer implemented services using machine learning models. To improve operation of the machine learning models, contextual information for prompts may be retrieved using a summarization level prioritized retrieval process. The summarization level prioritized retrieval process may take into account both similarity and summarization scores when selecting information to use as the contextual information. The retrieved contextual information may improve output generated by the machine learning model.

20 Claims, 7 Drawing Sheets

(56) References Cited

U.S. PATENT DOCUMENTS

| | | | | |
|---|---|---|---|---|
| 2026/0054698 | A1* | 2/2026 | Prentice .................... | B60T 7/06 707/707 |
| 2026/0072655 | A1* | 3/2026 | Wiseman .................. | G06F 8/35 707/707 |
| 2026/0072920 | A1* | 3/2026 | Lewis ............... | G06F 16/24578 707/707 |
| 2026/0087261 | A1* | 3/2026 | Koneru ................... | G06F 9/453 707/707 |
| 2026/0105288 | A1* | 4/2026 | Tarpley ............. | G06F 16/33295 707/707 |
| 2026/0127227 | A1* | 5/2026 | Payani .............. | G06F 16/90335 707/707 |
| 2026/0140941 | A1* | 5/2026 | Brenner ................ | G06F 16/242 707/707 |
| 2026/0140978 | A1* | 5/2026 | Cmielowski ...... | G06F 16/33295 707/707 |

OTHER PUBLICATIONS

Michael Ryaboy, "8 Common Mistakes in Vector Search (and How to Avoid Them)", Medium, AI Advances, Jan. 28, 2025, retrieved from <https://ai.gopubby.com/8-common-mistakes-in-vector-search-and-how-to-avoid-them-e48d849c23f8> on Jul. 29, 2025 (9 pages).

Nikhil Anand, "Why is RAG so effective? (How Attention Shapes Understanding in LLMs)", Medium, GoPenAI, Oct. 1, 2024, retrieved from <https://blog.gopenai.com/why-is-rag-so-effective-how-attention-shapes-understanding-in-llms-7932d2f7fbb1> on Jul. 29, 2025 (13 pages).

Rjnclarke, "RAG—Reworking Reranking Algorithms", Medium, Aug. 18, 2024, retrieved from <https://medium.com/@rjnclarke/rag-reworking-reranking-182ff0d04755> on Jul. 29, 2025 (20 pages).

"Semantic Chunking for RAG: Better Context, Better Results", Multimodal, Oct. 11, 2024, retrieved from <https://www.multimodal.dev/post/semantic-chunking-for-rag#:~:text=Semantic%20chunking%20enables%20RAG%20systems,it%20significantly%20enhances%20response%20quality> on Jul. 29, 2025 (13 pages).

Aggarwal et al., "ChunkRAG: Novel LLM-Chunk Filtering Method for RAG Systems", arXiv:2410.19572v1, Oct. 25, 2024, retrieved from <https://arxiv.org/html/2410.19572v1> on Jul. 29, 2025 (7 pages).

Zhong et al., "Mix-of-Granularity: Optimize the Chunking Granularity for Retrieval-Augmented Generation", arXiv:2406.00456v1, Jun. 1, 2024, retrieved from <https://arxiv.org/html/2406.00456v1> on Jul. 29, 2025 (17 pages).

Oracle. (n.d.). "About Prompts Auto-Complete", Oracle Transactional Business Intelligence, retrieved from <https://docs.oracle.com/en/cloud/saas/otbi/otbi-user/prompts-auto-complete.html> on Jul. 29, 2025 (1 page).

Kate Moran and Tim Neusesser, "Prompt Suggestions", Nielsen Norman Group, Apr. 25, 2025, retrieved from <https://www.nngroup.com/articles/prompt-suggestions/#:~:text=with%20the%20system.-,The%20Purpose%20of%20Prompt%20Suggestions,begin%20or%20what%20to%20ask> on Jul. 29, 2025 (8 pages).

Zhou et al., "Privacy-Aware RAG: Secure and Isolated Knowledge Retrieval", arXiv:2503.15548v1, Mar. 17, 2025, retrieved from <https://arxiv.org/abs/2503.15548> on Jul. 29, 2025 (10 pages).

Ammann et al., "Securing Rag: A Risk Assessment and Mitigation Framework", arXiv:2505.08728v2, May 21, 2025, retrieved from <https://arxiv.org/abs/2505.08728> on Jul. 29, 2025 (8 pages).

Jayasundara et al., "RAGent: Retrieval-based Access Control Policy Generation", arXiv:2409.07489v2, Sep. 13, 2024, retrieved from <https://arxiv.org/html/2409.07489v2> on Jul. 29, 2025 (22 pages).

Zeng et al., "The Good and The Bad: Exploring Privacy Issues in Retrieval-Augmented Generation (RAG)", arXiv:2402.16893v1, Feb. 23, 2024, retrieved from <https://arxiv.org/abs/2402.16893> on Jul. 29, 2025 (18 pages).

João Lages, "Transformers KV Caching Explained—How caching Key and Value states makes transformers faster", Medium, Oct. 8, 2023, retrieved from <https://medium.com/@joaolages/kv-caching-explained-276520203249> on Jul. 29, 2025 (3 pages).

Pope et al., "Efficiently Scaling Transformer Inference", arXiv:2211.05102v1, Nov. 9, 2022, retrieved from <https://arxiv.org/pdf/2211.05102> on Jul. 29, 2025 (18 pages).

Shi et al., "Keep the Cost Down: A Review on Methods to Optimize LLM's KV-Cache Consumption", arXiv:2407.18003v4, Nov. 20, 2024, retrieved from <https://arxiv.org/abs/2407.18003> on Jul. 29, 2025 (19 pages).

Li et al., "A Survey on Large Language Model Acceleration based on KV Cache Management", arXiv:2412.19442v2, Jan. 2, 2025, retrieved from <https://arxiv.org/abs/2412.19442> on Jul. 29, 2025 (43 pages).

* cited by examiner

SUMMARIZATION PRIORITIZED RETRIEVAL PROCESS

FIELD

Embodiments disclosed herein relate generally to managing operation of data processing systems. More particularly, embodiments disclosed herein relate to systems and methods to managing information retrieval.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
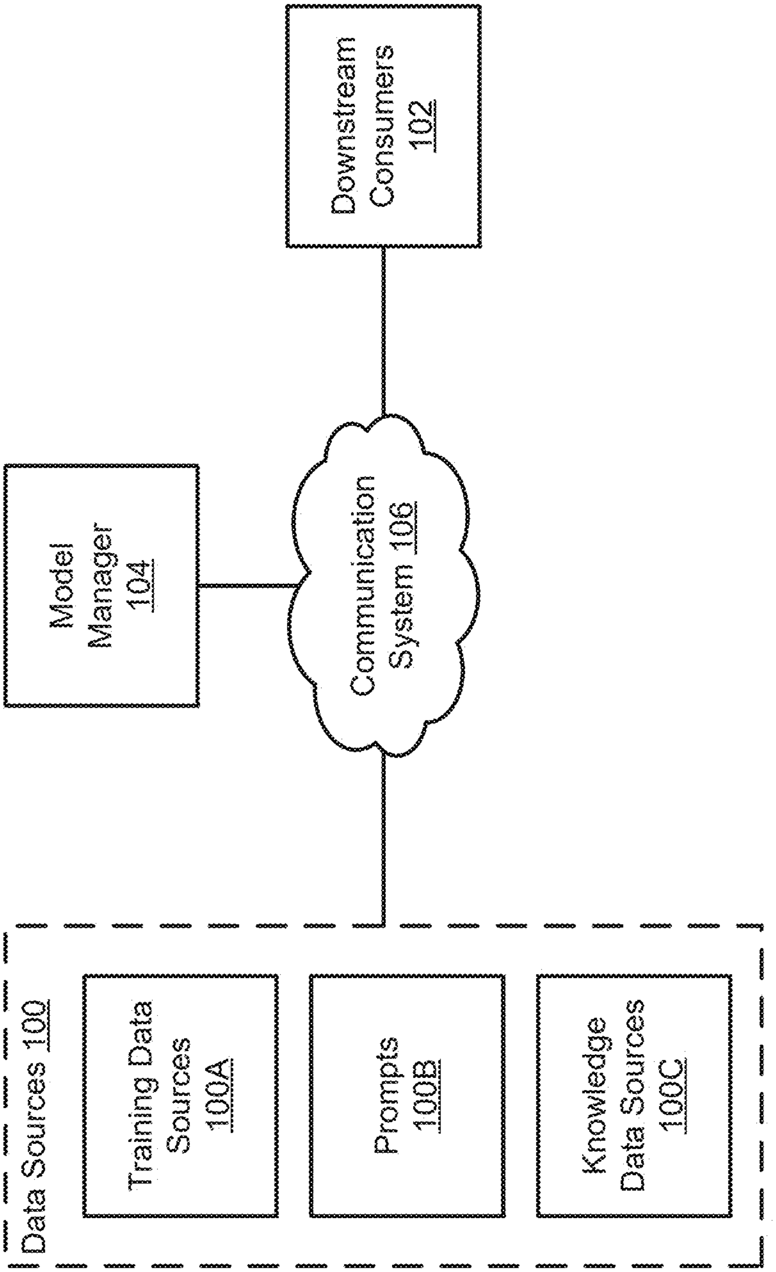
FIG. 1 shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems that may provide computer-implemented services. The computer-implemented services may be provided using trained machine-learning models (e.g., artificial intelligence models). The models (e.g., the trained machine-learning models) may be used to generate inferences regarding operation of the data processing systems, and the inferences may be used in downstream processes to increase a likelihood of desired operation of the data processing systems. For example, the models may be trained to infer information regarding occurrences of security events (e.g., security threats) to the data processing systems based on ingest data, and the operation of the data processing systems may be updated to mitigate (e.g., prevent) negative outcomes associated with the security events.

A quality (e.g., reliability, usability) of the inferences may depend on a quality (e.g., informational content) of the ingest data processed by the models to obtain the inferences. For example, the ingest data may be a prompt (e.g., input from a downstream consumer of the inferences), and if the informational content of the prompt is limited and/or ambiguous, then the ingest data may be of insufficient quality for generating an expected quality inference when processed by the model.

To increase a likelihood of generating expected quality inferences, the prompt may undergo preprocessing as part of a pipeline for the model. The model pipeline may include a retrieval-augmented generation (RAG) process for the prompt. For example, during the RAG process, contextual information (e.g., contextual data) for the prompt may be retrieved from a trusted knowledge data source for inclusion in the ingest data. The contextual data may include information usable to improve the informational content of the ingest data, thereby improving a quality of the ingest data. The information may be retrieved using a summarization level prioritized process that takes into account both similarity and summarization scores for the contextual information.

However, the addition of the contextual data to the ingest data may increase a size (e.g., a volume) of data processed by the model, which may lead to decreased model performance and/or may otherwise negatively impact provisioning of the computer-implemented services. For example, the increase in the size of the ingest data may cause a substantial increase in a number of tokens (e.g., representing elements of the ingest data) that the model must process at once during inferencing in order to generate an expected quality inference. At a larger scale, processing high volumes of tokens may require significant power and computing resources, increasing processing costs.

Thus, to reduce negative impacts on the provisioning of the computer-implemented services provided using the models, a size of ingest data for processing by the models may be managed to balance model performance with ingest data quality. To do so, portions of contextual data obtained via RAG processes that do not contribute to a quality improvement of the ingest data, such as redundant and/or irrelevant portions of the contextual data, may be removed prior to submitting the ingest data for processing by the models.

To do so, the model pipeline may include an iterative pruning process for the ingest data (e.g., the contextual data). During the iterative pruning process, portions that are identified as non-contributory may be pruned (e.g., removed) to reduce a size of the contextual data while maintaining a quality of the ingest data. Consequently, the size of the ingest data may be reduced to improve model performance (e.g., by decreasing token processing costs) while maintaining inference quality.

By doing so, the ingest data submitted for processing by the models may be managed in a manner that improves inference quality with reduced sacrifice to model performance. As a result, the computer-implemented services provided using the models may be more likely to be provided in a desired manner.

In an embodiment, a method for managing operation of a data processing system is provided. The method may include obtaining a prompt for processing using a trained machine learning model; performing a summarization level prioritized retrieval process to obtain contextual information for the prompt, the summarization level prioritized retrieval process using similarity information and summarization scores for chunks to obtain the contextual information; generating, using the prompt, the contextual information, and the trained machine learning model, a response to the prompt; and provisioning computer implemented services using the response.

Performing the summarization level prioritized retrieval process may include identifying a portion of the chunks based on similarity to the prompt; ranking, using at least the similarity information and the summarization scores, the portion of the chunks using a ranking function.

The summarization scores may be based on a likelihood of the chunks comprising summaries of information elements.

The summarization scores may be based on counts of words of the chunks matching summarization indicating elements.

Summarization indicating elements may include keywords, the keywords comprising at least one selected from a list consisting of: report, analysis, and summary.

The summarization indicating elements may also include metadata for source data from which the chunks are obtained. For example, the source data (e.g., original documents) may have metadata indicating a type of document. The type of the document may indicate whether the content and corresponding chunks are likely to be summarizations or raw information (e.g., the degree to which the chunks are either).

The ranking function may score each chunk of the portion of the chunks based on: similarity of the chunk to the prompt; and a summarization score of the summarization scores for the chunk.

The ranking function may also score each chunk of the portion of the chunks based on an age of a respective chunk.

The age of the respective chunk may be used by the ranking function to weight the similarity of the chunk to the prompt and the summarization score.

Ranking, using at least the similarity information and the summarization scores, the portion of the chunks using the ranking function may include filtering, from the portion of the chunks, a sub-portion of the chunks based on a summarization score threshold.

A non-transitory media may include instructions that when executed by a processor cause the method to be performed.

A system may include the non-transitory media and a processor, and may perform the method when the computer instructions are executed by the processor.

Turning to FIG. 1, a block diagram illustrating a distributed system in accordance with an embodiment is shown. The system shown in FIG. 1 may provide computer-implemented services. The computer-implemented services may include any type and quantity of computer-implemented services. For example, the computer-implemented services may include communication services, data storage services, database services, data generation services, and/or any other type of service that may be implemented with a computing device.

The computer-implemented services may be provided by data processing systems to consumers of the computer-implemented services (e.g., users of the data processing systems, other data processing systems). To provide the computer-implemented services, operation of the data processing systems may be managed, for example, in accordance with policies (e.g., security policies, acceptable use policies). The policies may be enforced via updates to the operation of the data processing system over time to increase a likelihood of providing desired (e.g., secure, reliable) computer-implemented services.

The operation of the data processing system may be managed using artificial intelligence. For example, trained machine-learning models (also referred to as models or trained models herein) may be used to assess, predict, and/or otherwise manage occurrences of events that may negatively impact provisioning of the computer-implemented services as desired, such as security events that may threaten the security of the data processing system (e.g., sensitive data accessible using the data processing systems).

To do so, a model may be trained to generate a response to (e.g., an inference based on) ingest data. For example, the ingest data may include information regarding programs being executed by components of a data processing system, and the model may be trained to identify, based on the ingest data, a security threat to the data processing system and/or actions for managing the security threat. To manage the security threat, the inference may be provided to a downstream process during which operation of the data processing system may be updated to mitigate an undesired outcome of the security threat.

However, the responses obtained from the models may not be reliable for managing the operation of the data processing system if informational content of the ingest data used during inferencing is below expected quality. For example, words and/or phrases included in the prompt may be ambiguous and/or may have special meaning (e.g., a term may have different meaning to an operator of the models than a meaning based on its dictionary definition). Therefore, additional informational content that provides context for the terms in the prompt may be required to increase a quality of the ingest data so that the model may be more likely to generate a reliable response.

To increase a likelihood of generating reliable responses during inferencing, a retrieval-augmented generation (RAG) process may be implemented to improve informational content of (e.g., a quality of) ingest data to the models. To do so, the prompt may undergo preprocessing, during which contextual data may be obtained for the prompt. For example, the prompt may be provided to a data pipeline for the model. The model pipeline may include a retrieval process, during which the prompt may be used to retrieve relevant contextual data from a trusted knowledge data source. For example, the contextual data may include information that reduces ambiguity of terms in the prompt and/or that defines special terms of the prompt; therefore, the contextual data may be included in the ingest data submitted for processing by the model. By doing so, the model may be more likely to generate a reliable inference due to the increase in quality of the ingest data.

However, adding the contextual data to the ingest data may increase a size (e.g., a volume) of the ingest data, which may lead to decreased model performance, increased processing costs, and/or may otherwise negatively impact provisioning of the computer-implemented services.

For example, during an inferencing process, the model may process a sequence of tokens, the tokens representing elements (e.g., words, portions of words, characters or symbols, punctuation, and/or phrases) of in the ingest data. To generate high quality (e.g., relevant, coherent, accurate) responses based on the sequence of tokens, the model may be required to process long sequences of tokens at once, which may be limited by its context window length. A larger context window length may be required to allow the model to handle more complex tasks that involve understanding of connections between (e.g., references to) different portions of the ingest data, especially when the different portions are represented by tokens that are far apart in the token sequence.

However, large quantities of tokens (e.g., long sequences of tokens, large context window lengths) may (i) require more computational power (e.g., leading to increased processing costs), (ii) introduce noise to the model, and/or (iii) reduce focus on most relevant portions of the ingest data. Consequently, provisioning of the computer-implemented services provided using the models may be negatively impacted. For example, when the models are used to manage operation of a data processing system, inference generation may become too costly to justify its use and/or the inferences may be unreliable for use in managing the operation of the data processing system (e.g., when the models are operating with limited parameters due to cost constraints).

Further, when the retrieval process is performed, the retrieved data may not necessarily provide sufficient context for the prompt. When searching trusted data sources for contextual information, useful information may be overlooked if certain search processes such as vector searching is performed. For example, the embedding functions used to create vectors used during the search may be imperfect and may lead to more useful information for context purposes not being identified. Consequently, even if similarity based retrieval processes are performed, the resulting inferences may be undesirable.

In general, embodiments disclosed herein may provide methods, systems, and/or devices for managing operation of data processing systems using a trained machine-learning model in a manner that is more likely to result in desirable management outcomes and/or creation of otherwise desirable inferences. To do so, (i) the size of ingest data submitted for processing by the model may be managed and (ii) a summarization level prioritized retrieval process may be performed. The size of the ingest data may be managed by pruning (e.g., removing) portions of contextual data obtained through RAG processing that do not contribute to a quality improvement of the informational content of the ingest data.

For example, elements of the contextual data such as repeated words, some adjectives, some punctuation, stopwords (e.g., defined by a negative dictionary), and/or other portions of the contextual data (e.g., irrelevant words) may not provide meaningful information relevant to core concepts of the prompt; therefore, these elements may be removed prior to submitting the ingest data for processing by the model.

To do so, the contextual data may undergo a pruning process prior to ingestion by model. During the pruning process, portions of the ingest data (e.g., the contextual data) may be identified and removed to obtain pruned ingest data. The pruned ingest data may be analyzed to determine whether the pruned ingest data meets pruning criteria. For example, the pruning criteria may include (i) similarity criteria specifying a minimum level of similarity between an embedding of the pruned ingest data and an embedding of the (original) ingest data, and/or (ii) size reduction criteria that may specify a maximum size and/or a minimum reduction in size for (pruned) ingest data that can be submitted for processing by the model. The pruning process may be performed iteratively until the pruning criteria are met (e.g., optimized), and the resulting pruned ingest data may be submitted to the model for processing.

As a result, the size of the ingest data may be reduced while conserving meaningful informational content relevant to the core concepts of the prompt, thereby maintaining a contribution of the contextual data to improving ingest data quality. Accordingly, token usage (e.g., processing) by the model may be reduced during inference generation, improving utilization of the context window length and reducing model processing costs.

To improve the content of the retrieved information for context purposes, the summarization level prioritized retrieval process may take into account both (i) similarity between portions of information (e.g., chunks) from trusted data sources and the prompt, and (ii) summarization scores for the chunks. The summarization scores may be based on a likelihood of chunks having summarizations of information rather than the raw information itself. For example, a chunk that includes raw information may include numerous information elements while, in contrast, a chunk that includes summaries of the raw information may include (i) information derived from the numerous information elements, and (ii) descriptions of relationships to the raw information (e.g., keywords such as summary, analysis, etc.). By taking into account both similarity and summarization score, retrieved sets of chunks may be more likely to include useful information for contextualization that would otherwise be overlooked if similarity to prompts alone was used as a retrieval basis.

For example, vectorization search may prioritize for matching which may cause chunks that only include raw information to be ranked more favorably than chunks that includes summaries (e.g., which may include fewer instances of information elements such as words present in a prompt).

By doing so, ingest data submitted for processing by the models may be managed in a manner that improves inference quality without sacrificing model performance. As a result, inferences generated based on the (pruned) ingest data (e.g., prompt and contextual information prioritized for summarization chunks rather than raw information chunks) may be more reliable for use in managing the operation of data processing systems and/or otherwise generating useful inferences.

To provide the above-mentioned functionality, the distributed system of FIG. 1 may include data sources 100, downstream consumers 102, model manager 104, and communication system 106. The distributed system, any components thereof, and/or any other types of devices or components not shown in FIG. 1 may perform all, or a portion of the computer-implemented services independently and/or cooperatively. Each of these components is discussed below.

Data sources 100 may include any type and/or number of data sources. Each of data sources 100 may include hardware and/or software components configured to obtain data, store data, provide data to other entities, and/or to perform any other tasks to facilitate performance of computer-implemented services. Different data sources of data sources 100 may facilitate similar and/or different computer-implemented services. For example, data sources 100 may include training data sources 100A, prompts 100B, knowledge data sources 100C, and/or other sources of data usable to facilitate operation of machine-learning models.

Training data sources 100A may include any number of data sources that provide training data for training of the models. Training data sources 100A may include sources of raw data, processed data (e.g., curated data), and/or other types of data usable to train (e.g., retrain, fine-tune) the models. Refer to the discussion of FIG. 2A for more information regarding training of models.

Prompts 100B may include any volume and/or type of data for processing by the models. For example, prompts 100B may include any number of prompts obtained from consumers of inferences generated by the models (e.g., individuals, computers). Prompts 100B may include unstructured data and may be used, at least in part, to generate ingest data to the models. For example, prompts 100B may not include sufficient informational content for generating expected quality inferences, and therefore may undergo prompt preprocessing (e.g., RAG processing) to improve the informational content of ingest data to the models. Refer to the discussion of FIG. 2A for more information regarding prompt preprocessing.

Knowledge data sources 100C may include any number and/or type of data sources that provide contextual data for prompts 100B. Knowledge data sources 100C may include a data source designated as a source of true data by an operator of the models. Knowledge data sources 100C may be managed by the operator and/or another entity. For example, knowledge data sources 100C may include information usable to improve a quality of a prompt of prompts 100*n*, such as informational content relevant to core concepts of the prompt, and may be queried during preprocessing of the prompt (e.g., during a RAG process). Refer to the discussions of FIGS. 2A-2B for more information regarding use of knowledge data sources 100C.

Data sources 100 may include data repositories (e.g., training data repositories and/or knowledge data repositories, not shown), and may provide data to (e.g., allow access to data by) model manager 104.

Downstream consumers 102 may include any number and/or type of downstream consumers. For example, downstream consumers 102 may include individuals, organizations, and/or computers. Downstream consumers 102 may consume all, or a portion of the computer-implemented services. For example, downstream consumers 102 may include users of a deployment of data processing systems that are managed using inferences from trained machine-learning models supported by model manager 104.

Downstream consumers 102 may consume all, or a portion of the inferences and/or output from downstream processes that use the inferences. For example, downstream consumers 102 may generate and/or provide prompts of prompts 100B (e.g., portions of ingest data) for processing by the models, and may consume (i) inferences generated by the models in response to the prompts (e.g., in response to the ingest data) and/or (ii) output from the downstream processes that use the inferences. The inferences and/or the output from the downstream processes may be used by downstream consumers 102 to improve decision-making and/or to automate tasks. For example, downstream consumers 102 may make decisions and/or initiate actions for managing operation of the deployment of data processing systems (not shown in FIG. 1) to mitigate occurrences of security events.

Model manager 104 may include any number of systems and may manage (e.g., host, support) any number of machine-learning models. Model manager 104 may perform tasks relating to management of and/or facilitation of use of the models. For example, model manager 104 may manage (e.g., facilitate) (i) training processes for the models, (ii) preprocessing of prompts for the models, (iii) inferencing processes using the models (e.g., and the preprocessed prompts), (iv) downstream processes that rely on inferences obtained using the models, and/or (v) distribution of the inferences and/or output derived from the inferences to downstream consumers 102, management of knowledge data sources 100C such as adding/remove data and establishing co-retrieval based rankings. Refer to the discussion of FIGS. 2A-2C for more details regarding operation of the models and management of contextual information sources.

Model manager 104 may include any number of systems that manage data pipelines for the models. The model pipelines may include structured automated processes that ingest, transform, and/or otherwise prepare data (e.g., based on prompts 100B) for use by the models. Therefore, model manager 104 may manage (e.g., perform, facilitate performance of, and/or otherwise support) the pipeline processes. For example, to improve a quality of ingest data to a model, model manager 104 may perform a retrieval process to obtain contextual data for a prompt submitted for processing by a model.

To manage a size of the ingest data to the model, model manager 104 may (i) perform a pruning process for the ingest data to obtain pruned ingest data, (ii) make determinations regarding whether the pruned ingest data meets pruning criteria (e.g., similarity criteria, size reduction criteria), (iii) perform additional iterations of the pruning process until the pruning criteria is met (or optimized), and/or (iv) perform other actions for preparing the ingest data for processing by the model.

To facilitate management of operation of a data processing system, model manager 104 may (i) implement the summarization level prioritized retrieval process, (ii) maintain summarization scores and/or other information for contextual information (e.g., chunks), (iii) use pruned ingest data to obtain a response (e.g., an inference) from the model, and/or (iv) use the response to provision computer-implemented services (e.g., distribute the response to downstream consumers 102, provide the response to downstream processes).

When providing their functionality, any of data sources 100, downstream consumers 102, model manager 104, and/or components thereof may perform all, or a portion of the actions and methods illustrated in FIGS. 2A-3C.

Any of (and/or components of) data sources 100, downstream consumers 102, and model manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data sources 100, downstream consumers 102, and/or model manager 104 are implemented using an internet of things (IoT) device, which may include a computing device. The IoT device may operate in accordance with a communication model and/or management model known to data sources 100, downstream consumers 102, model manager 104, and/or other devices.

Any of the components illustrated in FIG. 1 may be operably connected to each other (and/or components not illustrated) with communication system 106. Communication system 106 may facilitate communications between the components of FIG. 1. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1 as including a limited number of specific components, a system in accordance with an embodiment may include fewer, additional, and/or different components than those illustrated therein. For example, while the system of FIG. 1 shows a single management system (e.g., model manager 104), it will be appreciated that the system may include any number of management systems.

Figure 2A:
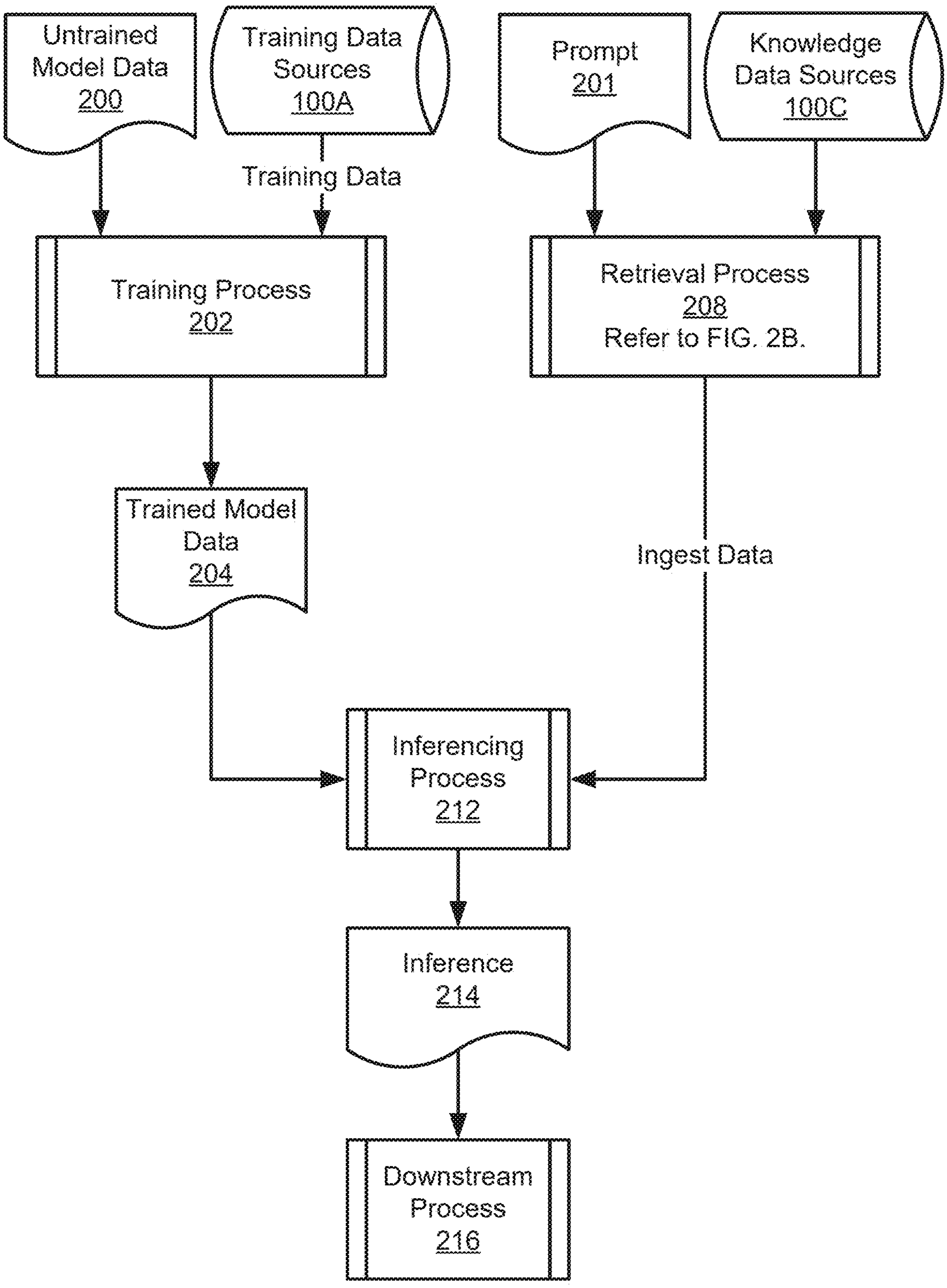
FIGS. 2A-2B show data flow diagrams in accordance with an embodiment.
Figure 2B:
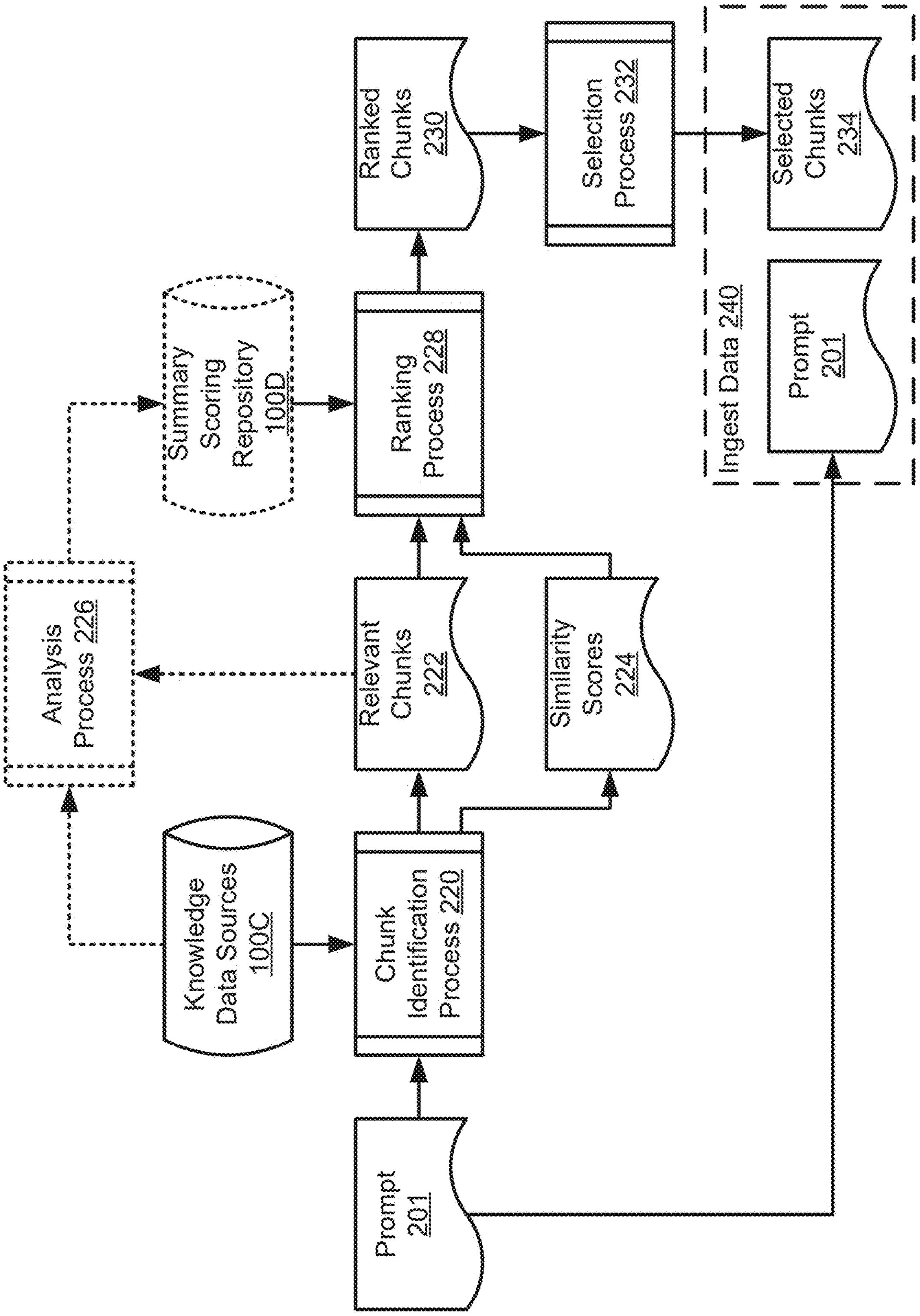

To further clarify embodiments disclosed herein, data flow diagrams in accordance with an embodiment are shown in FIGS. 2A-2B. In the diagrams, flows of data and processing of data are illustrated using different sets of shapes. A first set of shapes (e.g., 200, 201) is used to represent data structures, a second set of shapes (e.g., 202, 208) is used to represent processes performed using and/or that generate data, and a third set of shapes (e.g., 100A, 100C) is used to represent sources of data.

Turning to FIG. 2A, a first data flow diagram in accordance with an embodiment is shown. The first data flow diagram may illustrate data used in and data processing performed when facilitating operation of a trained machine-learning model. For example, the trained (machine-learning) model may be used to manage operation of a data processing system.

In the example shown in FIG. 2A, facilitating the operation of the model may include performance of a training process and an inferencing process. The training process may include, for example, initial training of an untrained model, retraining of a trained model, and/or fine-tuning of a trained model. The inferencing process may include, for example, obtaining inferences using a trained model.

To obtain a trained model, a management entity (e.g., model manager 104) may facilitate performance of training process 202. Training process 202 may include training an untrained model defined by untrained model data 200.

Untrained model data 200 may include information relating to model architecture, hyperparameters, and/or other information regarding an untrained model (e.g., optimization algorithm information, hidden layer information, bias function descriptions, activation function descriptions). A model type and/or size may be selected based on performance goals and/or constraints, training data availability and/or quality, budget, timeline, etc. For example, the model may include a probabilistic model such as a generative machine-learning model (e.g., a large language model).

During training process 202, untrained model data 200 may be updated using training data from training data sources 100A. For example, if the model is being trained to manage security for a data processing system, then the training data may include a corpus of information regarding identification of types of security threats to the data processing system, labeled with actions for responding to the types of security threats (e.g., actions for reconfiguring security settings of the data processing system accordingly). As the model is exposed to large numbers of relationships and/or patterns in the training data, weights and/or other parameters of untrained model data 200 may be modified to obtain trained model data 204.

Trained model data 204 may include model data (e.g., information regarding the architecture and/or hyperparameters of the model) and/or parameter values for the model (e.g., weights). Trained model data 204 may be used during an inferencing process, such as inferencing process 212, to generate inferences in response to ingest data.

The ingest data may include a portion of data for which an inference is desired to be obtained, and may be based on a prompt, such as prompt 201 (e.g., of prompts 100B). Prompt 201 may include a submission (e.g., from a downstream consumer of inferences) to be processed by a trained model. For example, prompt 201 may include information regarding operation of a data processing system. Prompt 201 may undergo prompt preprocessing as part of a data pipeline for the trained model. For example, prompt 201 may be provided to retrieval process 208.

Retrieval process 208 may be a summarization level prioritized retrieval process to obtain ingest data for processing during inferencing process 212. The summarization level prioritized retrieval process may (i) identify chunks from data sources 100 that are deemed to be similar to prompt 201 (e.g., based on vector searching), and (ii) rank the identified chunks based on summarization scores for the chunks.

For example, during retrieval process 208, a prompt may be used to generate a query (e.g., a keyword search query). The query may include, for example, search terms, search parameters, and/or other information. The query may then be used to search a data source to identify responsive chunks of data stored by the external data source.

For example, during retrieval process 208, knowledge data sources 100C may be searched to identify chunks of data responsive to terms of prompt 201. The identified chunks of data responsive to the query may then be ranked for relevance using a relevance ranking algorithm (which may take into account similarity to the prompt and summarization scores). Some number (e.g., best hits) of the ranked chunks may then be selected for use as contextual data for prompt 201. The contextual data may include information usable to provide context and/or meaning to (elements of) prompt 201; therefore, to improve a quality of the ingest data to the trained model (thereby improving a quality of an inference generated in response to the ingest data), the ingest data may include prompt 201 and/or the contextual data. Refer to FIG. 2B for additional details regarding retrieval process 208.

However, the ingest data may include unnecessary chunks of contextual data, such as chunks of contextual data that do not contribute to improving the context and/or meaning of prompt 201. The unnecessary chunks of contextual data may contribute to a size of the ingest data without improving its quality. To address this issue, the ingest data may be pruned during an iterative pruning process.

During the iterative pruning process, chunks of the contextual data that are identified as not contributing to a quality improvement of the ingest data may be removed from the ingest data to obtain pruned ingest data. The pruned ingest data may retain improvements to the context and/or meaning of core concepts of prompt 201, but may be of reduced size when compared to the ingest data.

The pruned ingest data, along with trained model data 204, may be provided to inferencing process 212. During inferencing process 212, a trained model may read the pruned ingest data and respond with an output likely to be associated with the input. In other words, the trained model may generate inference 214.

For example, the pruned ingest data may include information regarding malicious code being executed by a component of a data processing system, and inference 214 may include actions for updating security settings of the data processing system that are likely to mitigate an outcome of the execution of the malicious code according to relationships and/or patterns learned by the trained model during training process 202.

Inference 214 may be used to provision computer-implemented services. For example, inference 214 may be provided to downstream process 216. Downstream process 216 may include any quantity and/or type of downstream processes that rely on inferences generated by trained machine-learning models. Downstream process 216 may include delivery of inference 214 to a downstream consumer (e.g., as a computer-implemented service) and/or further processing of inference 214.

For example, downstream process 216 may include a type of process for updating operation of the data processing system based on inference 214. Downstream process 216 may include a policy enforcement process, wherein security policies for the data processing system are enforced based on information included in inference 214 (e.g., actions, security and/or configuration settings) in order to mitigate outcomes associated with the execution of the malicious code. For example, operation of the data processing system may be updated to prevent access to sensitive data, to prevent network communication via components of the data processing system, and/or to disable operation of portions of components of the data processing system.

Although described with respect to security of the data processing system, it will be appreciated that the models may be trained and used to update operation of the data processing system in various capacities without departing from embodiments disclosed herein. For example, the operation of the data processing system may be updated to improve user experience, to manage failures of components of the data processing system, to improve efficient allocation of resources (e.g., computing and/or power resources), and/or to meet other operational goals for the data processing system.

Thus, using the data flows shown in FIG. 2A, operation of a data processing system may be managed based on inferences generated by trained machine-learning models. By doing so, operation of the data processing systems may be updated timely, and the data processing systems may be more likely to operate in a desired manner.

Turning to FIG. 2B, a second data flow diagram in accordance with an embodiment is shown. The second data flow diagram may illustrate data used in and data processing performed to retrieve contextual information for a prompt. FIG. 2B may be an expansion of retrieval process 208 of FIG. 2A.

To obtain the contextual information, chunk identification process 220 may be performed. During chunk identification process 220, prompt 201 may be analyzed to identify any number of chunks (e.g., from knowledge data sources 100C) that are deemed to be relevant such as relevant chunks 222. To identify relevant chunks 222, prompt 201 (or a query based on the prompt) may be vectorized, processed by an embedding function, or otherwise used to derive an embedding for searching knowledge data sources 100C.

During the search, the embedding may be compared to embeddings for different chunks in knowledge data sources 100C to identify a level of similarity between the prompt and each chunk. It will be appreciated that vector search based algorithms such as the hierarchical navigable small world algorithm (or other similar approximate algorithms) may be performed to efficiently identify chunks having embeddings that are deemed to be similar to the prompt embedding without exhaustively searching all of the chunk embeddings. The chunks may be deemed to be similar to the prompt if, for example, the cosine similarity between the chunk embedding and the prompt embedding meet criteria (e.g., minimum threshold for similarity, or relative threshold set based on the average cosine similarity between the prompt embedding and the chunk embedding population).

The identified relevant chunks 222 and similarity scores 224 for the chunks identified via chunk identification process 220 may then be used in ranking process 228.

During ranking process 228, relevant chunks 222 may be ranked using a ranking function. The ranking function may rank relevant chunks 222 based on the similarity scores and/or summarization scores from summary scoring repository 100D. The summarization scores may be stored in summary scoring repository 100D, and may be updated overtime via analysis process 226, discussed in greater detail below.

The ranking function may, for a given chunk, sum the similarity score for the chunk with the summarization score for the chunk. The sum may be a weighted sum which may weight the similarity score for the chunk and the summarization score for the chunk inversely to one another (e.g., as weighting for the similarity score goes up, the weighting for the summarization score for the chunk may go down).

Additionally, the ranking function may attenuate the weighting of the summarization score for the chunk based on an age of the chunk. For example, a decay factor may be used to reduce the weighting of the summarization score for the chunk based on the age of the chunk (e.g., when added to knowledge data sources 100C, when source data such as a document from which the chunk was obtained was created, etc.).

For example, the ranking function may have a form of quantification=$\alpha$*(Similarity Score)+(1−$\alpha$)*Decay Factor*(Summarization Score for the Chunk), where a may weight the importance of the similarity versus the quantification, and the Decay Factor may attenuate the quantification for older chunks (e.g., so that similarity based considerations dominate the rankings for older chunks).

The ranking function may, therefore, be usable to obtain quantifications for each of relevant chunks 222, which may then be rank ordered based on the quantifications to obtain ranked chunks 230.

Once ranked chunks 230 are obtained, selection process 232 may be performed. During selection process 232, a portion of ranked chunks 230 may be selected for addition to ingest data 240. The portion may be selected using any selection criteria (e.g., certain number of chunks, highest ranked, etc.). The selection criteria may or may not take into account context window considerations for subsequent inferencing, such as limits on the length of the context window (e.g., which may limit total quantity of ingested data as well as total output that can be generated). For example, a target context window length may be used to select the quantity of selected chunks 234.

Returning to the discussion of analysis process 226, summarization scores for relevant chunks 222 and/or other chunks from knowledge data sources 100C may be obtained and/or updated. The summarization scores may be obtained by (i) analyzing each chunk for indicators of summarization of raw information, and (ii) using the indicators to generate the summarization score.

The indicators of summarization of raw information may include, for example, keywords. The key words may include, for example, analysis, summary, review, and/or other terms which may indicate that the content of the chunk is based on higher level information derived from raw information. For a given chunk, the chunk may be analyzed for presence of these key words, and counts of instances of the key words may be recorded.

Once the counts for the key words in a chunk are obtained, the counts of the key words may be used to obtain a corresponding summarization score. The summarization score may be obtained by applying a scoring system to the counts of the key words. The scoring system may award points for each instance of the key words. The points awarded for each instance of a keyword may vary (e.g., 2 points may be awarded for an instance of the word summary, but 1.5 points may be awarded for an instance of the word analysis).

For example, consider a scenario where a chunk includes text from a document. The text may recite "During our analysis of the laptops, we found that none of the laptops were able to meet performance requirements. Consequently, in summary, no existing products are able to meet our requirements." The aforementioned text recites analysis and summary. Based on the example scoring system, the chunk may be awarded 3.5 points.

The raw summarization scores may be used directly, or may be normalized (e.g., to a range or other criteria). Once obtained, the summarization scores for the chunks may be used to rank the chunks (along with similarity).

Thus, using the flow shown in FIG. 2B, selected chunks 234 may be obtained that may be more likely to include relevant information such as summarizations for contextualizing prompt 201. Consequently, inferences generated by trained models as discussed with respect to FIG. 2A may be of higher quality.

For example, by taking summarization scores into account during ranking, it may be more likely that some chunks having higher level summarizations are added to selected chunks 234, as opposed to chunks that predominantly include information elements (e.g., raw information). Accordingly, prompts may not need to be engineered (e.g., explicit statements regarding summary, analysis, etc.) extensively to cause chunks that primarily summarize information to be added to selected chunks 234.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
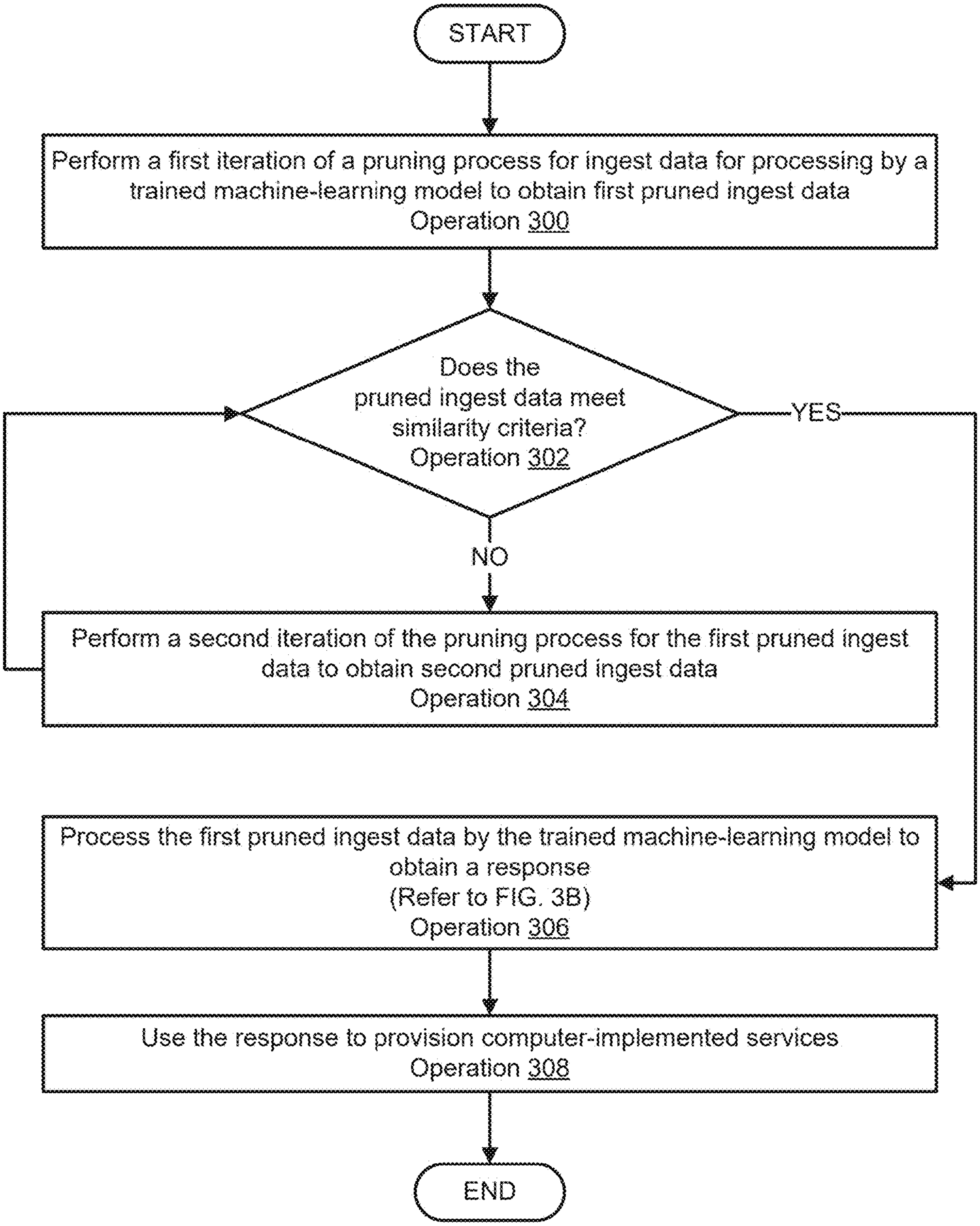
FIGS. 3A-3C show flow diagrams illustrating methods in accordance with an embodiment.
Figure 3B:
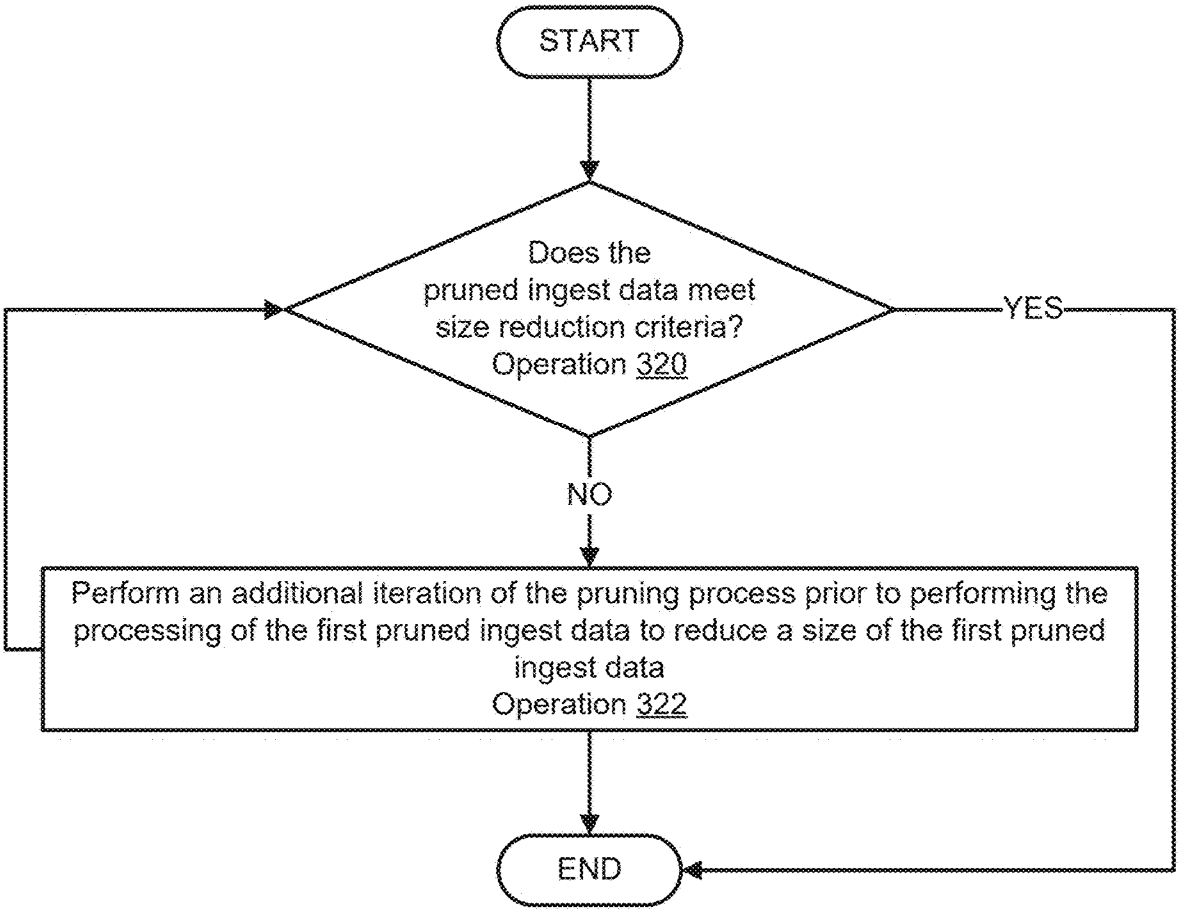
Figure 3C:
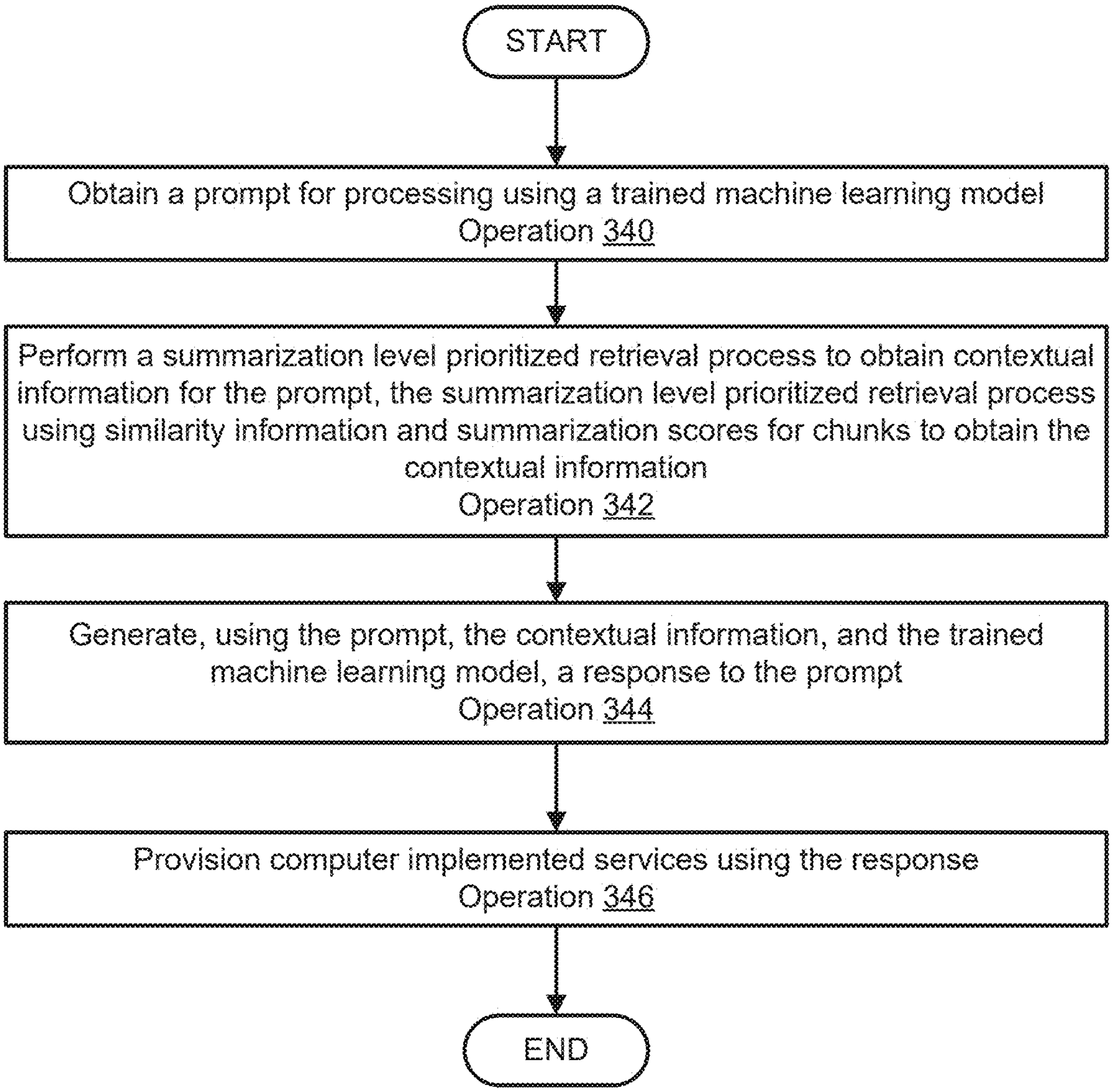

As discussed above, the components of FIG. 1 may perform various methods to manage operation of a distributed system. FIGS. 3A-3C illustrate methods that may be performed by the components of the system of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a first flow diagram illustrating a method in accordance with an embodiment is shown. The first flow diagram may illustrate various operations performed while managing operation of a data processing system.

At operation 300, a first iteration of a pruning process for ingest data for processing by a trained machine-learning model may be performed to obtain first pruned ingest data. The first iteration of the pruning process may be performed by methods described with respect to pruning process.

The ingest data may include contextual data for a prompt submitted for processing by the trained machine-learning model. For example, the contextual data may be obtained by performing a RAG process similar to retrieval process 208 of FIG. 2A. The operation of the data processing system may be managed using a response from the trained machine-learning model based on the ingest data.

Performing the first iteration of the pruning process may include (i) identifying a portion of the ingest data, and/or (ii) removing the identified portion from the ingest data to obtain the first pruned ingest data. For example, the portion of the ingest data may be a defined portion of defined portions including at least one element from a list of elements consisting of: a word, a portion of a second word, a phrase, punctuation, and/or other types of elements. The portion of the ingest data may be identified by performing a first removal process of a removal algorithm similar to the removal algorithm used with respect to the pruning process.

For example, the removal algorithm may be adapted to identify and remove portions of the ingest data that have a likelihood (e.g., below a likelihood threshold) of impacting a representation of the (subsequently resulting) first pruned ingest data that is used to drive operation of the trained machine-learning model to obtain the response.

The portion of the ingest data may be identified (e.g., during the first removal process) by (i) reading a list of elements from a negative dictionary that defines stop-words and/or other elements unlikely to impact the response from the trained machine-learning model, (ii) identifying elements in the ingest data that match (e.g., within a threshold) any elements of list of elements, and (iii) treating the identified elements as the portion of the ingest data.

The portion of the ingest data may be identified by (i) syntactically analyzing the ingest data to classify elements of the ingest data by type (e.g., verbs, prepositions, repeated words, useful adjectives, redundant or useless adjectives), (ii) identifying specific classes of elements from the ingest data (e.g., based on a schema that specifies the repeated words, the redundant or useless adjectives, and/or other classes of elements are to be removed), and (iii) treating the identified specific classes of elements as the portion of the ingest data.

The identified portion may be removed from the ingest data by generating a new data structure (e.g., the first pruned ingest data) that does not include the identified, and/or by other methods.

By virtue of removing the identified portion, a size of the first pruned ingest data may be inferior to a size of the ingest data. The first pruned ingest data may be treated as a candidate for being processed by the trained machine-learning model (e.g., rather than the ingest data being processed by the trained machine-learning model).

At operation 302, a determination regarding whether the first pruned ingest data meets similarity criteria may be made. For example, the similarity criteria may specify a minimum level of similarity between a representation of the first pruned ingest data and a representation of the ingest data. The representations may include embeddings. Therefore, making the determination may include (i) obtaining a first embedding for the ingest data and a second embedding for the first pruned ingest data, (ii) obtaining a level of similarity based on the first embedding and the second embedding, and/or (iii) comparing the level of similarity to the minimum level of similarity.

The embeddings (e.g., the first embedding and the second embedding) may be obtained by (i) reading at least one of the embeddings (e.g., from storage), (ii) receiving at least one of the embeddings (e.g., from another device), and/or (iii) generating at least one of the embeddings. For example, the first embedding for the first pruned ingest data may be generated by providing the first pruned ingest data to a trained embedding model and treating output from the trained embedding model as the first embedding.

The level of similarity may be obtained by (i) reading the level of similarity (e.g., from storage), (ii) receiving the level of similarity (e.g., from another device), and/or (iii) generating the level of similarity. For example, the level of similarity may be generated by substituting variables of a similarity function with corresponding values of the first embedding and corresponding values of the second embedding, and evaluating the similarity function with the substituted variables to obtain the level of similarity.

The level of similarity may be compared to the minimum level of similarity by evaluating whether the level of similarity is inferior to the minimum level of similarity (e.g., evaluating a Boolean expression). For example, if the level of similarity is inferior to the minimum level of similarity, then the first pruned ingest data may not be sufficiently similar to the ingest data; therefore the first pruned ingest data may be treated as not being of sufficient quality for processing by the trained machine-learning model.

Otherwise, for example, if the level of similarity is not inferior to the minimum level of similarity (e.g., if the level of similarity is the same as or exceeds the minimum level of similarity), then the first pruned ingest data may be sufficiently similar to the ingest data; therefore, the first pruned ingest data may be treated as being of sufficient quality for processing by the trained machine-learning model.

In a first instance of the determination where the first pruned ingest data does not meet the similarity criteria, the method may proceed to operation 304 following operation 302.

At operation 304, a second iteration of the pruning process for the first pruned ingest data may be performed to obtain second pruned ingest data. The second iteration of the pruning process may be performed by methods similar to those described with respect to the pruning process discuss with respect to FIG. 2A.

Performing the second iteration of the pruning process may include (i) recovering the ingest data, and/or (ii) performing a second removal process (as part of the removal algorithm) on the recovered ingest data. The second removal process may be different from the first removal process performed during the first iteration of the pruning process (e.g., at operation 300) so that the second pruned ingest data is different than the first pruned ingest data.

The ingest data may be recovered by (i) reading the ingest data (e.g., from storage), and/or (ii) receiving the ingest data (e.g., from another device). The second removal process may be performed by (i) obtaining a list of elements that were removed from the ingest data in order to obtain the first pruned ingest data, (ii) excluding at least a portion of elements from the list of elements from removal during the second removal process, and/or (iii) setting a parameter of the second removal process so that the second pruned ingest data is different than the first pruned ingest data.

The second pruned ingest data may be evaluated to determine whether the second pruned ingest data meets the similarity criteria. In other words, the second pruned ingest data may be treated as the first pruned ingest data at operation 302.

In a second instance of the determination where the first pruned ingest data does meet the similarity criteria, the method may proceed to operation 306 following operation 302. However, prior to operation 306, the first pruned ingest data may undergo further analysis and/or processing. An example is provided with respect to FIG. 3B.

Turning to FIG. 3B, a second flow diagram illustrating a method in accordance with an embodiment is shown. The second flow diagram may illustrate various operations performed to prepare ingest data for processing by a trained machine-learning model. FIG. 3B illustrates operations that may be performed prior to operation 306 of FIG. 3A.

At operation 320, a second determination may be made regarding whether the first pruned ingest data (e.g., from operation 302 of FIG. 3A) meets size reduction criteria. The determination may be made by (i) obtaining a measure of a size of the first pruned ingest data (e.g., obtaining a total count of characters in the ingest data, estimating a total number of tokens generated based on the ingest data), (ii) obtaining the measure of a size of the ingest data, and/or (iii) evaluating the measure of the size of the first pruned ingest data with respect to thresholds specified by the size reduction criteria. For example, the size reduction criteria may specify thresholds such as a maximum measure of size of ingest data for processing by the trained machine-learning model and/or a minimum reduction in size of pruned ingest data with respect to (original, pre-pruned) ingest data.

Evaluating the measure of the size of the first pruned ingest data may include (i) evaluating a ratio of the first pruned ingest data to the ingest data and comparing the result to a minimum size reduction threshold to determine whether the first pruned ingest data meets size reduction criteria (e.g., is small enough) for processing by the trained machine-learning model, and/or (ii) comparing the measure of the size of the first pruned ingest data to a maximum size threshold of ingest data allowed for processing by the trained machine-learning model.

In a first instance of the second determination where the size reduction criteria are not met, the method may proceed to operation 322 following operation 320.

At operation 322, an additional iteration of the pruning process may be performed to reduce a size of the first pruned ingest data. The additional iteration of the pruning process may be performed by methods similar to those described with respect to operation 300 of FIG. 3A, operation 304 of FIG. 3A, and/or by other methods. For example, during the additional iteration of the pruning process, the ingest data may not be recovered and an additional portion of the first pruned ingest data may be identified and removed to further pruned the first pruned ingest data.

The additional iteration of the pruning process may be performed (and additional determinations regarding whether the further pruned ingest data meets similarity criteria and the size reduction criteria may be made) prior to performing the processing of the first pruned ingest data (e.g., the further pruned ingest data) at operation 306 of FIG. 3A. The method may end following operation 322 (e.g., the method may proceed to operation 306 of FIG. 3A).

In a second instance of the second determination where the size reduction criteria are met, the method may end following operation 320 (e.g., the method may proceed to operation 306 of FIG. 3A).

Returning to FIG. 3A, at operation 306, the first pruned ingest data (e.g., from operation 302, or further pruned ingest data from operation 322 of FIG. 3B) may be processed by the trained machine-learning model to obtain a response. The first pruned ingest data may be processed by the trained machine-learning model by making the first pruned ingest data available as input to the trained machine-learning model.

For example, the first pruned ingest data may be made available as input to the trained machine-learning model by (i) further processing the first pruned ingest data (e.g., via a pipeline of the trained machine-learning model), and/or (ii) ingesting the first pruned ingest data to an input layer of the trained machine-learning model. Based on the processing of the first pruned ingest data, the trained machine-learning model may generate the response.

At operation 308, the response may be used to provision computer-implemented services. The response may be used by (i) providing the response to a downstream consumer as a first portion of the computer-implemented services, (ii) providing the response to a downstream process to obtain an output from the downstream process, and/or (iii) using the output from the downstream process to provision a second portion of the computer-implemented services.

Using the response may include updating the operation of the data processing system. For example, the response may include information regarding policies that should be enforced on a data processing system in order to increase a likelihood of providing the computer-implemented services (e.g., as desired) in view of information included in the first pruned ingest data. Refer to the discussion of downstream process 216 of FIG. 2A for more details regarding use of the response and/or updating the data processing system.

The method may end following operation 308.

Thus, using the flows shown in FIGS. 3A-3B, embodiments disclosed herein may provide for reduction in computational cost of generating inferences through ingest data pruning.

In addition to pruning the ingest data, the quality of the ingest data may also be improved, as discussed with respect to FIG. 3C.

Turning to FIG. 3C, a third flow diagram illustrating a method in accordance with an embodiment is shown. The third flow diagram may illustrate various operations performed while managing operation of a data processing system.

At operation 340, a prompt for processing by a trained machine learning model may be obtained. The prompt may be obtained by reading it from storage, obtaining it from another entity, generating it (e.g., based on user input), and/or via other methods.

At operation 342, a summarization level prioritized retrieval process is performed to obtain contextual information for the prompt. The summarization level prioritized retrieval process may use similarity information and summarization scores for chunks to obtain the contextual information.

The summarization level prioritized retrieval process may include (i) retrieving chunks based on similarity to the prompt, (ii) obtaining summarization scores for the chunks, (iii) ranking the chunks using a ranking function (e.g., that takes into account similarity and summarization scores), and (iv) selecting a portion of the ranked chunks using selection criteria to obtain the contextual information.

The chunks may be retrieved based on similarity by obtaining an embedding for the prompt, and searching for chunks that have similar embeddings.

The summarization scores for the chunks may be read from storage and/or generated. If generated, the summarization scores may be generated by (i) analyzing the chunks with respect to keywords to obtain key word counts, and (ii) applying a scoring system to the counts of the keywords to obtain the summarization scores. The keywords may include, for example, report, summary analysis, etc.

In an embodiment, the summarization scores for the chunks may also be generated by analyzing the chunks with respect to other keywords to obtain other key word counts. The other keywords may indicate lack of summarized data. For example, the other keywords may include terms such as single, sole, individual, unique, solitary, separate, etc.

The scoring system may use the counts of both the words and the other words to obtain the summarization scores. For example, the scoring system may award positive points for the counts of the keywords and negative points for the counts of the other keywords.

In an embodiment, the summarization scores for the chunks are generated by (i) using a large language model and pre-prompt to analyze the chunks with respect to summary level of information in the chunks, and (ii) applying a scoring system for the ascribed level of information. To guide the large language model, a taxonomy in the form of a hierarchy may be used, with different summarization levels ascribed to different levels of the hierarchy. The taxonomy may be used as contextual information for the pre-prompt.

It will be appreciated that the summarization scores may be updated, for example, batch wise after a prescribed number of chunks in the knowledge data source has been changed, and/or other criteria is met (e.g., each chunk may be summarization scored when added/modified).

The ranking function may rank the retrieved chunks based on (i) similarity, and (ii) the summarization scores of the retrieved chunks.

In an embodiment, the ranking function may filter out chunks having a summarization score that falls below a threshold level. The threshold level may be predetermined, may be based on the summarization scores of the relevant chunks and/or chunk population in the knowledge data sources, etc.

A portion of the rank ordered chunks may be selected as the contextual information using selection criteria. The selection criteria may indicate, for example, that a top number of the ranked chunks are to be used as the contextual information. Other types of selection criteria may be used.

At operation 344, a response to the prompt may be generated. For example, the response and contextual information may be ingested by the trained machine learning model, which may generate the response.

At operation 346, computer implemented services are provisioned using the response. The computer implemented services may be provisioned similarly to as discussed with respect to FIGS. 3A-3B.

Thus, using the flow shown in FIG. 3C, embodiments disclosed herein may provide for retrieval and use of contextual information based on both similarity to a prompt and rankings of portions of the contextual information with respect to co-occurrence in source data.

Figure 4:
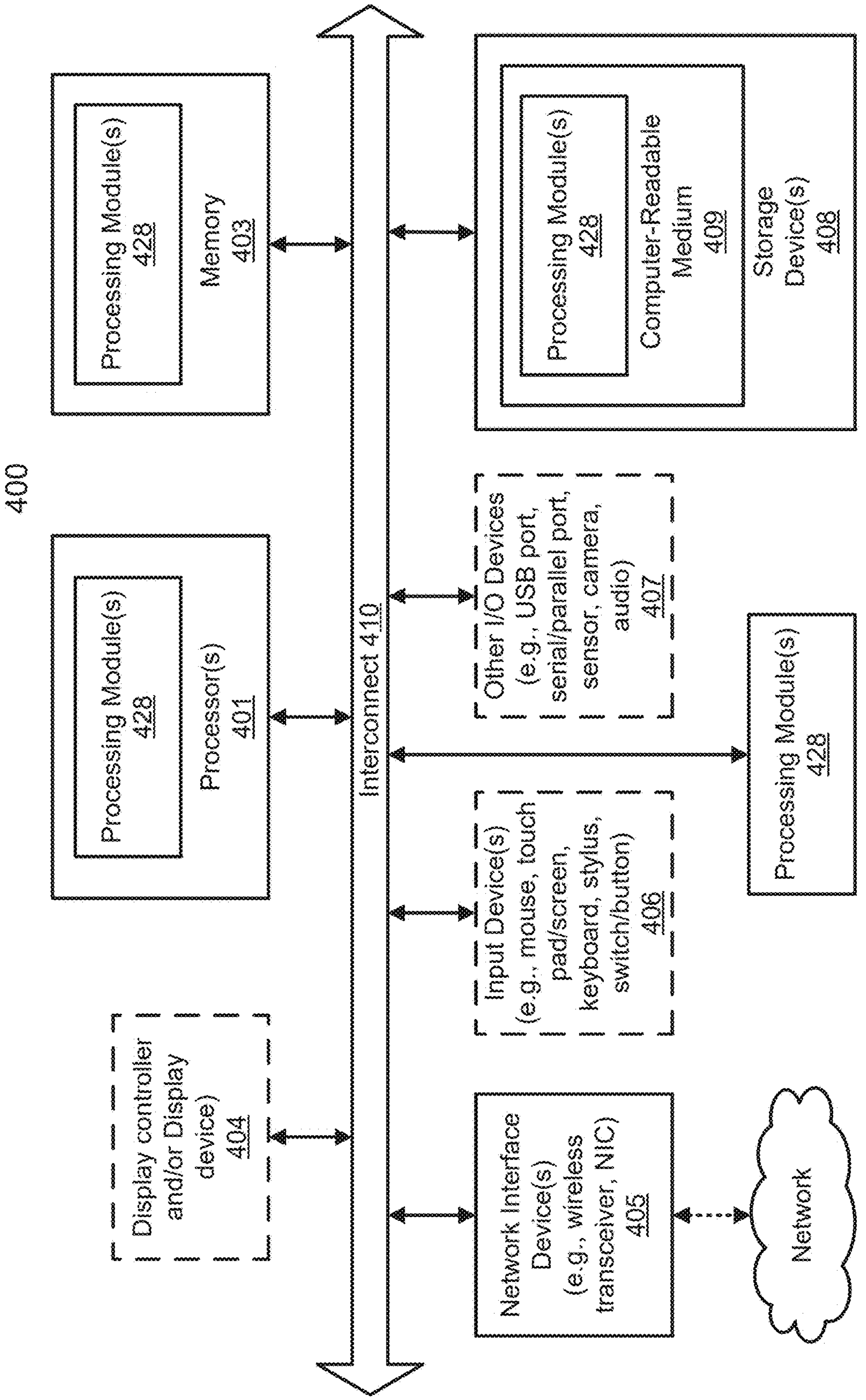
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

obtaining a prompt for processing using a trained machine learning model;

performing a summarization level prioritized retrieval process to obtain contextual information for the prompt, the summarization level prioritized retrieval process using similarity information and summarization scores for chunks to obtain the contextual information;

generating, using the prompt, the contextual information, and the trained machine learning model, a response to the prompt; and provisioning computer implemented services using the response, wherein performing the summarization level prioritized retrieval process comprises:

identifying a portion of the chunks based on similarity to the prompt; and ranking, using at least the similarity information and the summarization scores, the portion of the chunks using a ranking function, and wherein the ranking function scores each chunk of the portion of the chunks based on:

similarity of a respective chunk to the prompt; and a summarization score of the summarization scores for the respective chunk.

2. The method of claim 1, wherein the summarization scores are based on a likelihood of the chunks comprising summaries of information elements.

3. The method of claim 2, wherein the summarization scores are based on counts of words of the chunks matching summarization indicating elements.

4. The method of claim 3, wherein the summarization indicating elements comprise keywords, the keywords comprising at least one selected from a list consisting of:

report, analysis, and summary.

5. The method of claim 3, wherein the summarization indicating elements further comprise metadata for source data from which the chunks are obtained.

6. The method of claim 1, wherein the ranking function further scores each chunk of the portion of the chunks based on an age of the respective chunk.

7. The method of claim 6, wherein the age of the respective chunk is used by the ranking function to weight the similarity of the chunk to the prompt and the summarization score.

8. The method of claim 1, wherein ranking, using at least the similarity information and the summarization scores, the portion of the chunks using the ranking function comprises:

filtering, from the portion of the chunks, a sub-portion of the chunks based on a summarization score threshold.

9. A non-transitory machine-readable medium having instructions stored therein, which when executed by a processor, cause the processor to perform operations for managing operation of a system, the operations comprising:

obtaining a prompt for processing using a trained machine learning model;

performing a summarization level prioritized retrieval process to obtain contextual information for the prompt, the summarization level prioritized retrieval process using similarity information and summarization scores for chunks to obtain the contextual information;

generating, using the prompt, the contextual information, and the trained machine learning model, a response to the prompt; and provisioning computer implemented services using the response, wherein performing the summarization level prioritized retrieval process comprises:

identifying a portion of the chunks based on similarity to the prompt; and ranking, using at least the similarity information and the summarization scores, the portion of the chunks using a ranking function, and wherein the ranking function scores each chunk of the portion of the chunks based on:

similarity of a respective chunk to the prompt; and a summarization score of the summarization scores for the respective chunk.

10. The non-transitory machine-readable medium of claim 9, wherein the summarization scores are based on a likelihood of the chunks comprising summaries of information elements.

11. The non-transitory machine-readable medium of claim 10, wherein the summarization scores are based on counts of words of the chunks matching summarization indicating elements.

12. The non-transitory machine-readable medium of claim 11, wherein the summarization indicating elements comprise keywords, the keywords comprising at least one selected from a list consisting of:

report, analysis, and summary.

13. A system, comprising:

a processor; and a memory coupled to the processor to store instructions, which when executed by the processor, cause operations for managing operation of the system to be performed, the operations comprising:

obtaining a prompt for processing using a trained machine learning model;

performing a summarization level prioritized retrieval process to obtain contextual information for the prompt, the summarization level prioritized retrieval process using similarity information and summarization scores for chunks to obtain the contextual information;

generating, using the prompt, the contextual information, and the trained machine learning model, a response to the prompt; and provisioning computer implemented services using the response, wherein performing the summarization level prioritized retrieval process comprises:

identifying a portion of the chunks based on similarity to the prompt; and ranking, using at least the similarity information and the summarization scores, the portion of the chunks using a ranking function, and wherein the ranking function scores each chunk of the portion of the chunks based on:

similarity of a respective chunk to the prompt; and a summarization score of the summarization scores for the respective chunk.

14. The system of claim 13, wherein the summarization scores are based on a likelihood of the chunks comprising summaries of information elements.

15. The system of claim 14, wherein the summarization scores are based on counts of words of the chunks matching summarization indicating elements.

16. The system of claim 15, wherein the summarization indicating elements comprise keywords, the keywords comprising at least one selected from a list consisting of:

report, analysis, and summary.

17. The system of claim 15, wherein the summarization indicating elements further comprise metadata for source data from which the chunks are obtained.

18. The system of claim 13, wherein the ranking function further scores each chunk of the portion of the chunks based on an age of the respective chunk.

19. The system of claim 18, wherein the age of the respective chunk is used by the ranking function to weight the similarity of the chunk to the prompt and the summarization score.

20. The system of claim 13, wherein ranking, using at least the similarity information and the summarization scores, the portion of the chunks using the ranking function comprises:

filtering, from the portion of the chunks, a sub-portion of the chunks based on a summarization score threshold.

* * * * *